United States Patent [19]

Seike et al.

[11] Patent Number: 5,316,072

[45] Date of Patent: May 31, 1994

[54] SEALING MEMBERS FOR USE IN GAS PREHEATER

[75] Inventors: Shoji Seike; Keiichiro Watanabe, both of Nagoya; Akira Ito, Ama, all of Japan

[73] Assignee: NGK Insulators, Ltd., Japan

[21] Appl. No.: 903,946

[22] Filed: Jun. 26, 1992

Related U.S. Application Data

[62] Division of Ser. No. 542,753, Jun. 25, 1990, Pat. No. 5,145,011.

[30] Foreign Application Priority Data

Jul. 19, 1989 [JP] Japan .................. 1-184493
May 25, 1990 [JP] Japan .................. 2-133882

[51] Int. Cl.$^5$ .................................. F28D 19/04
[52] U.S. Cl. ........................ 165/9; 165/905; 277/96.2; 277/DIG. 6
[58] Field of Search ........... 165/9, 905; 277/96.2, 277/DIG. 6

[56] References Cited

U.S. PATENT DOCUMENTS

| | | |
|---|---|---|
| 3,407,866 | 10/1963 | Sawchuk . |
| 3,746,352 | 7/1923 | Bao et al. . |
| 3,903,959 | 9/1975 | Fushimi et al. . |
| 4,093,243 | 6/1973 | Kishida et al. . |
| 4,135,686 | 1/1980 | Pereira . |
| 4,296,937 | 10/1981 | Handa ........................ 165/9 |
| 4,364,729 | 12/1982 | Fresch . |
| 4,911,227 | 3/1990 | Saito ........................ 165/10 |

FOREIGN PATENT DOCUMENTS

| | | |
|---|---|---|
| 1062003 | 9/1979 | Canada . |
| 2540482 | 3/1976 | Fed. Rep. of Germany . |
| 61-161333 | of 0000 | Japan . |
| 33796 | of 1982 | Japan ........................ 165/9 |
| 58-16188 | 1/1983 | Japan . |
| 187794 | 11/1983 | Japan . |
| 60-251391 | 12/1985 | Japan . |

*Primary Examiner*—Albert W. Davis, Jr.
*Attorney, Agent, or Firm*—Parkhurst, Wendel & Rossi

[57] ABSTRACT

A sealing member for use in a gas preheater is adapted to seal a gap between an outer peripheral portion of a rotor and a housing in the gas preheater or a gap between a side face of the rotor and a radial sealing member. At least a part of said sealing member is made of an inorganic glass and/or a wear resistive ceramic having a coefficient of thermal expansion of not more than $70 \times 10^{-7}/°$ C. A sealing member for use in a gas preheater may comprise a heat resistive ceramic, and a corrosion resistive steel, wherein the ceramic is substantially surrounded with the corrosion resistive steel, excluding a sliding surface of the ceramic.

3 Claims, 9 Drawing Sheets

FIG_1

FIG_2

FIG_3

FIG_4

FIG_5

FIG_6

FIG_7

FIG_11

FIG_12

FIG_13

FIG_14

FIG_15

FIG_16

FIG_17

SEALING MEMBERS FOR USE IN GAS PREHEATER

This application is a Rule 60 divisional application of Ser. No. 07/542,753 filed Jun. 25, 1990, now U.S. Pat. No. 5,145,011.

BACKGROUND OF THE INVENTION (1) Field of the Invention

The present invention relates to sealing members for use in a gas preheater.

(2) Related Art Statement

Figure 23:
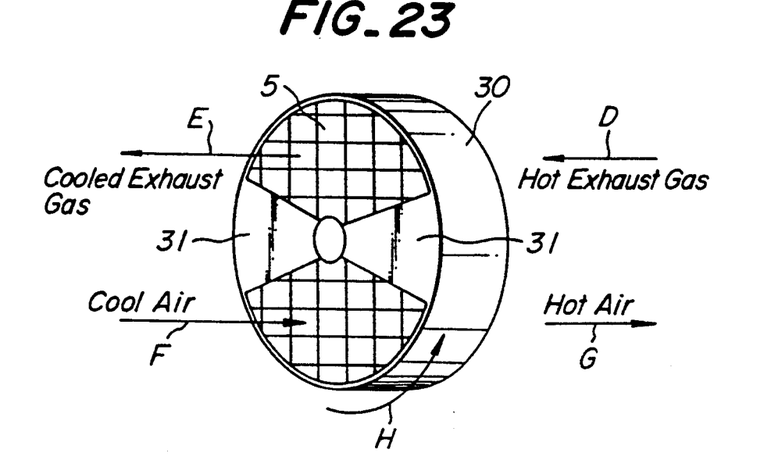
FIG. 23 is a perspective outline view of the air preheater.

Gas preheaters are used for recovering heat from exhaust gases with combustion air through heat exchange in thermal power generating boilers, ship boilers, and chemical apparatuses such as oil refiners, evaporating kilns, and reforming furnaces, and for improving heat efficiency. FIG. 23 shows a perspective outline view of a principal portion of an air preheater.

A rotor 5 is rotatably placed in a rotor housing 30, and two radial sealing plates 31 are provided for each side face of the rotor 5. The rotor housing 30 is supported by pedestals (not shown). The rotor 5 is rotated by a driving unit (not shown) in a direction of arrow H.

Hot exhaust gases are passed through an upper side of the rotor 5 as shown by an arrow D, and air is passed through a lower side of the rotor in a counter flow direction as shown by an arrow F. The exhaust gas layer is isolated from the air layer by the radial sealing plates 31. Heating elements, which are fitted into the rotor 5, absorb heat from the hot exhaust gases. When cold air is passed through the heating elements during rotation of the rotor 5, cold air is heated, and resulting hot air is then led to a boiler or the like (not shown) as shown by an arrow G. On the other hand, since heat is removed from the hot exhaust gas, cold exhaust gas is discharged outside as shown by an arrow E.

In such an air preheater, gaps are present between the outer periphery of the rotor 5 and the rotor housing 30 and between the side faces of the rotor 5 and the radial sealing plates 31, respectively. The exhaust gases and air leak through these gaps to lower heat efficiency. Therefore, it is important to enhance the sealing effect by making the gaps as small as possible.

The gap between the outer periphery of the rotor and the housing is structurally sealed by making this gap as small as possible.

The temperature of the exhaust gas is 300°-400° C., and that of air is in a range from room temperature to around 100° C. The rotor in which the heating element is housed is deformed corresponding to changes in the above temperatures range. In the structural sealing, the gap becomes greater due to expansion or permanent strain owing to such temperature changes. Consequently, the sealing effect is deteriorated.

The gap between the side face of the rotor and the radial sealing plate is structurally sealed by making the gap between twelve or twenty four diaphragms attached to the side face of the rotor and the radial sealing plates made of a metal as small as possible.

However, such a technique has a limitation upon the sealing effect. When the structural material is corroded with an exhaust gas component, the gap becomes greater to lower the sealing effect.

On the other hand, when the gap between the sealing members is eliminated and the members are slid under pressure, it can be expected that the sealing effect is improved.

Besides the above-mentioned problems in the structural sealing, since a fuel used in a boiler is coal, heavy oil or the like in the case of the rotating type air preheater for the combustion in the boiler used in the thermal power station, corrosive gas components such as oxides of sulfur, oxides of nitrogen and the like are contained in exhaust gases. Thus, since the exhaust gas is condensed at lower temperature portions in the air preheater, there is the problem in that parts of the air preheater are likely to be corroded. Further, there is another problem in that dust in the hot exhaust gas attach to the parts of the heat elements of the air preheater, and deteriorate heat exchange efficiency of the air preheater. Thus, in order to remove such attached matters, the air preheater is timely washed with water. In addition, the boiler in the thermal power station is continuously operated for a long time period, and is stepped down for only a very short time. Therefore, the above attached matters are removed by washing the air preheater with water in a hot state at about 200° C. without the air preheater being fully cooled. Consequently, there is another problem in that the parts of the air preheater undergo severe thermal shocks.

Furthermore, the rotary type air preheater to be used for the combustion of the boiler used in the thermal power station is a large scale apparatus in which the diameter of the rotor is as much as 1-20 m. Accordingly, the size of a single part to be used in the air preheater is great. For example, a sealing member having a size of 200×100×50 mm is used. Therefore, the thermal shock conditions against the sealing member are extremely severe in the case that the preheater is washed with water in the above hot state.

A slidable member to be used in the rotary type air preheater for combustion of boilers in the thermal power plant needs excellent wear resistance, corrosion resistance, and thermal shock resistance. Although SS steel or corrosion resistance steel is used as the conventional sealing member, wear resistance and corrosion resistance are still insufficient, so that troublesome maintenance is necessary. Particularly, such materials are not satisfactory as sliding members.

SUMMARY OF THE INVENTION

It is an object of the present invention to provide sealing members for use in gas preheaters, which sealing members have excellent wear resistance, are not corroded with a hot exhaust gas component, and are stable against thermal shock applied on washing with water.

The present invention relates to the sealing member for use in the gas preheater, which sealing member is adapted to seal the gap between the outer periphery of the rotor and the housing of the gas preheater and to seal the gap between the side face of the rotor and the radial sealing member, and is characterized in that at least a part of the sealing member is made of an inorganic glass and/or a wear resistive ceramic having a coefficient of thermal expansion of not more than $70 \times 10^{-7}/°C$.

According to another aspect of the invention, the sealing member comprises a heat resistive ceramic, and a corrosion resistive steel, wherein the wear resistive ceramic is substantially surrounded by the corrosion resistive steel, excluding a sliding surface of the ceramic.

These and other objects, features and advantages of the invention will be appreciated upon reading of the following description of the invention when taken in conjunction of the attached drawings, with the understanding that some modifications, variations and changes of the same could be made by the skilled person in the art to which the invention pertains without departing from the spirit of the invention or the scope of the claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
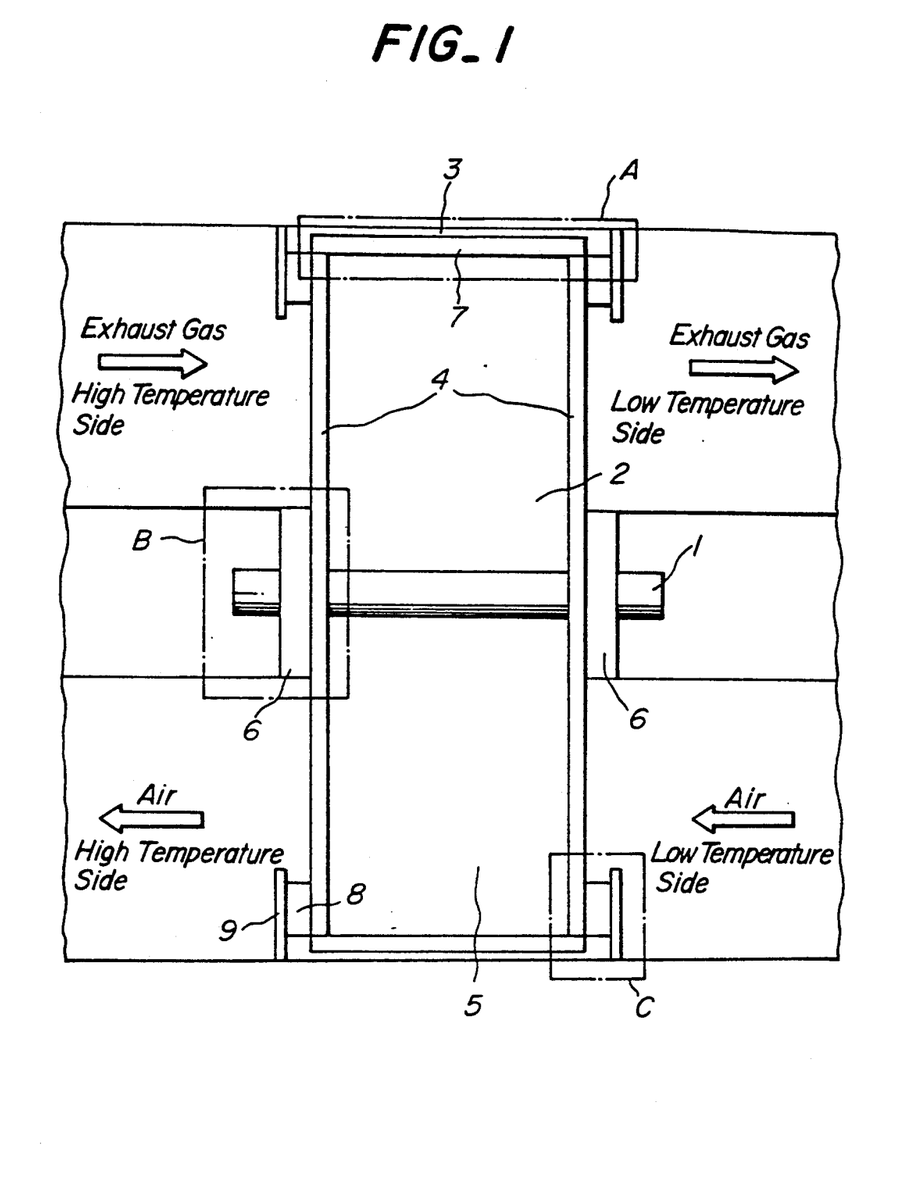
FIG. 1 is a side outline view of an air preheater according to the present invention.
Figure 2:
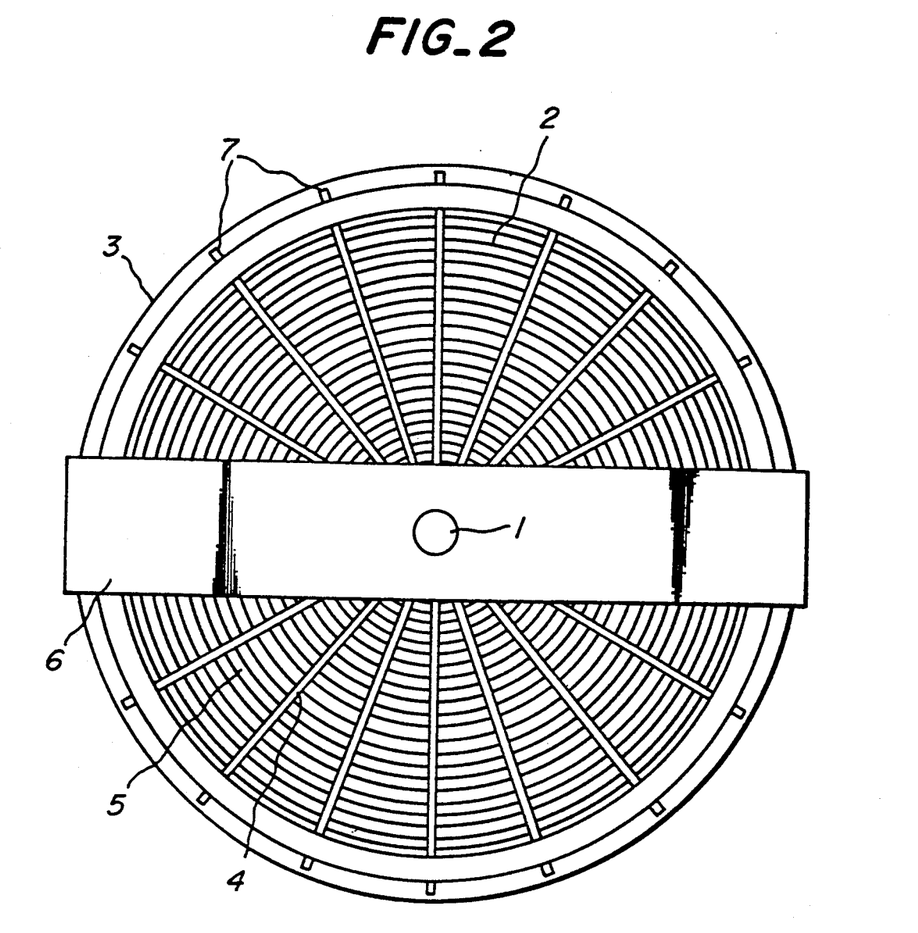
FIG. 2 is a front outline view of the air preheater.

FIGS. 1 and 2 are a side outline view and a front outline view of the air preheater, respectively. A rotor 2 is supported by a rotary shaft, and placed in a housing 3. The rotor 2 is divided into 12, 24, . . . or n sections by diaphragm plates 4. Heating elements 5 are placed in the respective divided sections. The housing is divided into an exhaust gas vessel and an air vessel. When the rotor rotates, heat in the exhaust gas is stored in the heating elements located in the exhaust gas vessel, and stored heat heats air in the air vessel. The temperatures of the exhaust gas and air are, for example, 350° C. and 60° C., respectively. When the exhaust gas and air pass through the air preheater, the exhaust gas is cooled to 140° C., while air is heated to 300° C. Heated air then enters a boiler (not shown) under pressure. A difference in pressure between the air and the exhaust gas is, for example, around 2,500 mmaq. Therefore, when air passes through the air preheater, air slightly leaks into the exhaust gas vessel due to this difference in pressure.

Air first leaks through a gap between the diaphragm plate 4 and the radial sealing plate 6 at the side face of the rotor. Second, such a leakage occurs through a gap between an axial sealing plate 7 and the housing 3 at the outer periphery of the rotor 2. The exhaust gas and air kept in the gaps among the heating elements enter and leak into the air vessel and the exhaust gas, respectively, on rotation of the rotor.

A sealing structure is contrived to make the above leakage as small as possible. Now, a method for effecting sealing by making the gap between the diaphragm plate 4 and the radial sealing plate 6 as small as possible is called "radial seal B". A method for effecting sealing by making the gap between the axial sealing plate 7 provided at the outer periphery of the rotor and the housing 3 as small as possible is called "axial seal A". A method for effecting sealing by making the gap between a sealing bar 9 attached to the housing 3 and the housing 3 as small as possible through installation of sealing members 8 at side faces of the outer peripheral portion of the rotor is called "bypass seal C", so that the exhaust gas and air may be prevented from entering the gap between the outer periphery of the rotor and the housing.

The present invention is characterized in that the sealing structure and material are specified by using an inorganic glass and/or a wear resistive ceramic having a coefficient of thermal expansion of not more than $70 \times 10^{-7}/°$ C. in at least one of three seals: the radial seal, the axial seal and the bypass seal.

Preferably, the sealing member is made of the wear resistive ceramic substantially surrounded by a corrosion resistive steel, excluding a sliding surface of the ceramic.

First, the radial seal B will be explained.

The diaphragm plates 4 are provided at the side face of the rotor 2, extending in radial directions. The diaphragm plate 4 and the radial sealing plate 6 separate an air side from an exhaust gas side, and effects sealing therebetween.

Figure 3:
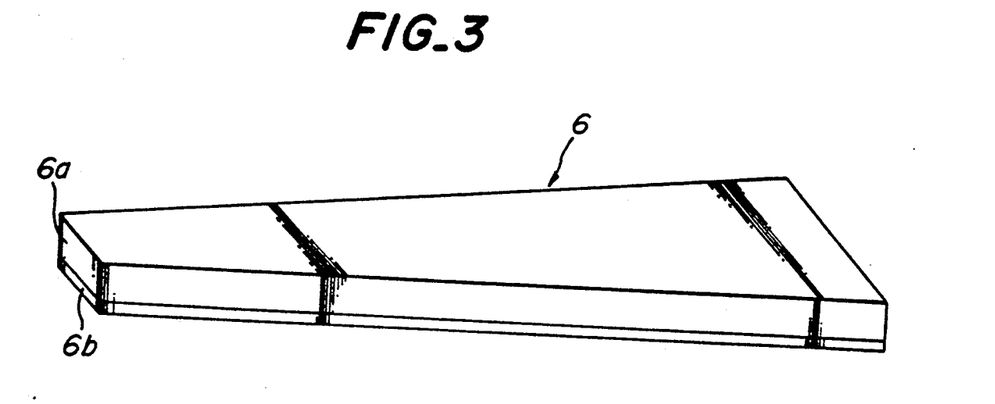
FIG. 3 is a perspective view of a radial sealing plate.

As shown in FIG. 3 in an enlarged scale, the radial sealing plate 6 is constituted by bonding a base body 6a with a thin plate 6b. The base body 6a is entirely constituted by a corrosion resistive steel sheet or a ceramic in a shape shown in FIG. 3, and the thin plate 6b is bonded thereto. The thin plate 6b is made of a wear resistive ceramic or an inorganic glass.

Figure 4:
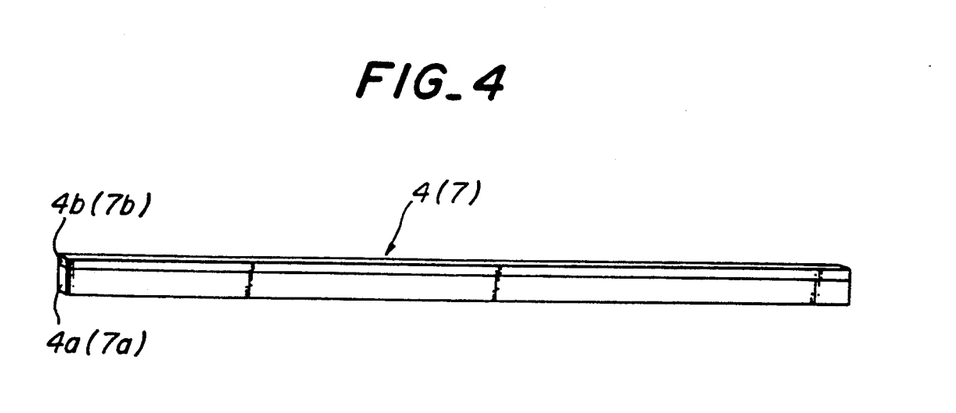
FIG. 4 is a perspective view of a diaphragm plate (axial sealing plate)

The diaphragm plate 4 has a structure in which a thin plate 4b is provided on a thick base body 4a as shown in FIG. 4. The thin plate 4b may be a ceramic or inorganic glass thin plate bonded onto the base body 4a made of the same material as that of the base body 6a shown in FIG. 3. Alternatively, the thin plate 4b may be formed by lining the base body with enamel or glass.

As highly wear resistive ceramics, for example, silicon nitride, silicon carbide, alumina, mullite, sialon, zirconia, and alumina-containing porcelain etc. may be recited. These materials have higher hardness and more excellent wear resistance as compared with metals. Further, oxides of sulfur, oxides of nitrogen, etc., which are contained in the exhaust gas in the air preheater, react with water to produce sulfuric acid, sulfurous acid, nitric acid, nitrous acid, etc. The above-mentioned wear resistive ceramics are stable against these acids.

As the inorganic glass and the glass lining, a so-called acid resistive enamel is preferred. For example, two kinds of enamels for use in the chemical industry provided in JIS may be recited below.

1. Glass lining mainly composed of silicic acid (not less than 55%), boric acid (0–10%) and alkali (10–20%).

2. Acid resistive enamel mainly composed of silicic acid (not less than 40%), boric acid (0–10%) and alkali (10–30%).

The thickness of the thin plate 6b or 4b or that of the glass lining is not more than 3 mm.

Among the above-mentioned wear resistive ceramics, alumina and zirconia have great coefficients of thermal expansion, and poor thermal shock resistance. As the base bodies 6a and 4a, it is preferable to use ceramics having the coefficient of thermal expansion of not more than $70 \times 10^{-7}/°$ C., for example, porcelain, mullite, silicon nitride, silicon carbide or sialon.

When the base body 6a, 4a is integrally joined to the thin plate 6b, 4b made of the ceramic or the inorganic glass, they are preferably bonded together with the inorganic glass or inorganic adhesive from the standpoint of durability, although they may be joined mechanically.

The radial sealing plate 6 and the diaphragm plate 4 are arranged and sealed as shown in FIGS. 1 and 2 in the state that the thin plates 6b and 4b made of the ceramic or the glass are opposed to each other. At that time, a slight gap may be provided between the thin plates 6b and 4b, or they may be made slidable under pressure. They may be pressed relative to each other with an external load, or the pressing may be effected by utilizing the self weights of the radial sealing plate 6 and the diaphragm plate 4.

According to this embodiment, since the layer of the wear resistive ceramic or inorganic glass is provided at the opposed faces of the radial sealing plate and the diaphragm plate, the sealing faces have great wear resistance and corrosion resistance. Therefore, excellent sealing is always effected. Further, when the thickness of the wear resistive ceramic layer is set at not more than 3 mm, the thermal shock resistance of the entire sealing member can be improved even if the material having the great coefficient of thermal expansion, such as alumina, is used.

In particular, when the radial sealing plate is slid relative to the diaphragm plate under pressure, the wear resistive ceramic or inorganic glass (particularly, the glass lining) affords great effect, so that a gap is always prevented from being formed between them while the sealing member is not deformed, worn, or corroded. Thereby, the heat efficiency can further be enhanced.

In addition, when the coefficient of thermal expansion of the ceramic used for the base body of the radial sealing plate or the diaphragm plate is made not greater than $70 \times 10^{-7}/°$ C., the thermal deformation of the entire sealing member can be made smaller, and durability against thermal shocks due to water-washing, etc. is further enhanced.

As mentioned above, according to the sealing member of the present invention, the sealing effect is high, and the use life is prolonged. Therefore, for example, the air-preheating efficiency is increased in the case of the thermal power generation boiler, the ship boiler, etc. In addition, when the sealing member is used in the chemical plants such as the oil refiner, the evaporating kiln and the reforming furnace, the heat-recovering efficiency is increased. Moreover, the safety during use can be improved, and the frequency of maintenance can be decreased.

When the base body is made of a corrosion resistive steel and a thin plate made of a wear resistive ceramic is bonded onto this base body, the radial sealing plate may be formed as follows: The entire shape of the radial sealing plate is divided into plural sections, and a panel is formed by bonding a thin plate of the wear resistive ceramic to a thin plate made of the corrosion resistive steel. Then, the radial sealing plate having a given shape is formed by combining several thus formed panels together. Further, a plurality of panels are formed by applying an enamel to the surface of each of the thin plates of the corrosion resistive steel, and the radial sealing plate having a given shape is formed by combining these panels.

Figure 5:
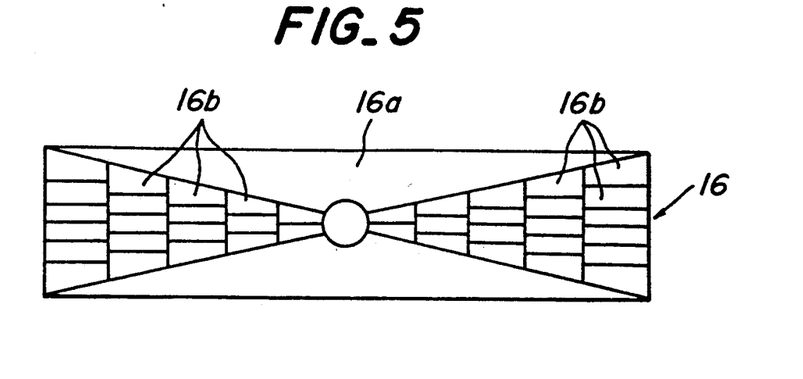
FIGS. 5 and 6 are front views of other radial sealing plates.

For example, FIG. 5 shows a radial sealing plate 16 in which ceramic or inorganic glass blocks 16b are combined to the surface of a base body 16a made of a corrosion resistive steel to form fan-like flat shapes as a whole. Alternatively, fan-like thin ceramic or inorganic plates 16b are bonded to the surface of the base body.

Figure 6:
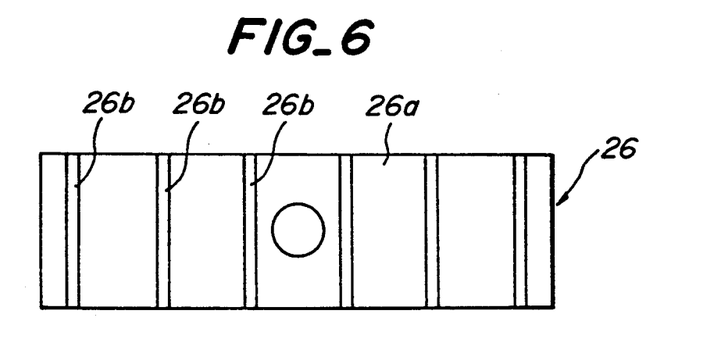

Moreover, FIG. 6 shows another radial sealing plate 26 in which a plurality of linear ceramic or inorganic glass guides 26b are provided parallel to one another on the surface of the base body 26a made of the corrosion resistive steel, and are to be subjected to sliding with the diaphragm plate.

Figure 7:
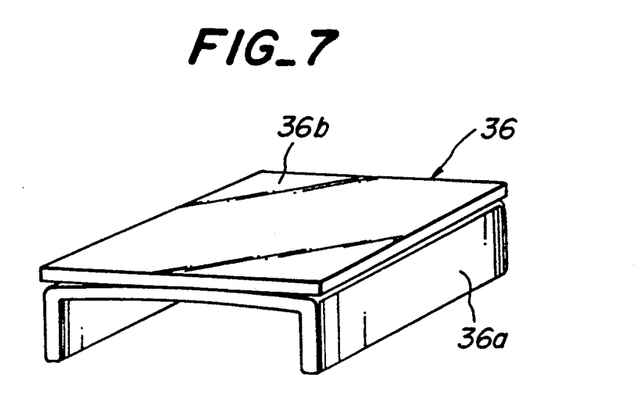
FIG. 7 is a perspective view of a block for a still other radial sealing plate.

Further, FIG. 7 shows a radial sealing plate which is formed by obtaining a composite plate 36 through bonding a planar ceramic or inorganic glass plate 36b to the rear face of a corrosion resistive steel plate having a U-letter shaped section and combining a number of such composite plates in a rectangular or fan-like shape as a whole.

Next, the axial sealing (See FIG. 1) will be explained.

The present invention is also applicable to the axial sealing plate 7. For example, the axial sealing plate may have the same shape with the diaphragm plate shown in FIG. 4.

That is, as is the same with the diaphragm plate shown in FIG. 4, the axial sealing plate 7 may be a bar-like laminate in which a thin plate 7b is provided on a base body 7a. The axial sealing plate is opposed to the housing face. Preferably, the axial sealing plate 7 is press contacted with the housing face, so that the thin plate 7b is slid along the inner surface of the housing under pressure during rotating of the rotor 5. Thereby, the axial seal A is effected between the axial sealing plate 7 and the housing.

The material of the base body 7a of the axial sealing plate 7 may be a corrosion resistive steel and a ceramic have a coefficient of thermal expansion of not more than $70 \times 10^{-7}/°$ C. as is the same with the base body 7a of the diaphragm plate shown in FIG. 4. As is entirely the same with the thin plate 7b of the diaphragm plate shown in FIG. 4, the material of the thin plate of the axial sealing plate may be a wear resistive ceramic, a glass lining or the like. Furthermore, the axial sealing plate may have just the same construction as that of the diaphragm plate 4. By so doing, a similar effect can be obtained.

Figures 8, 9:
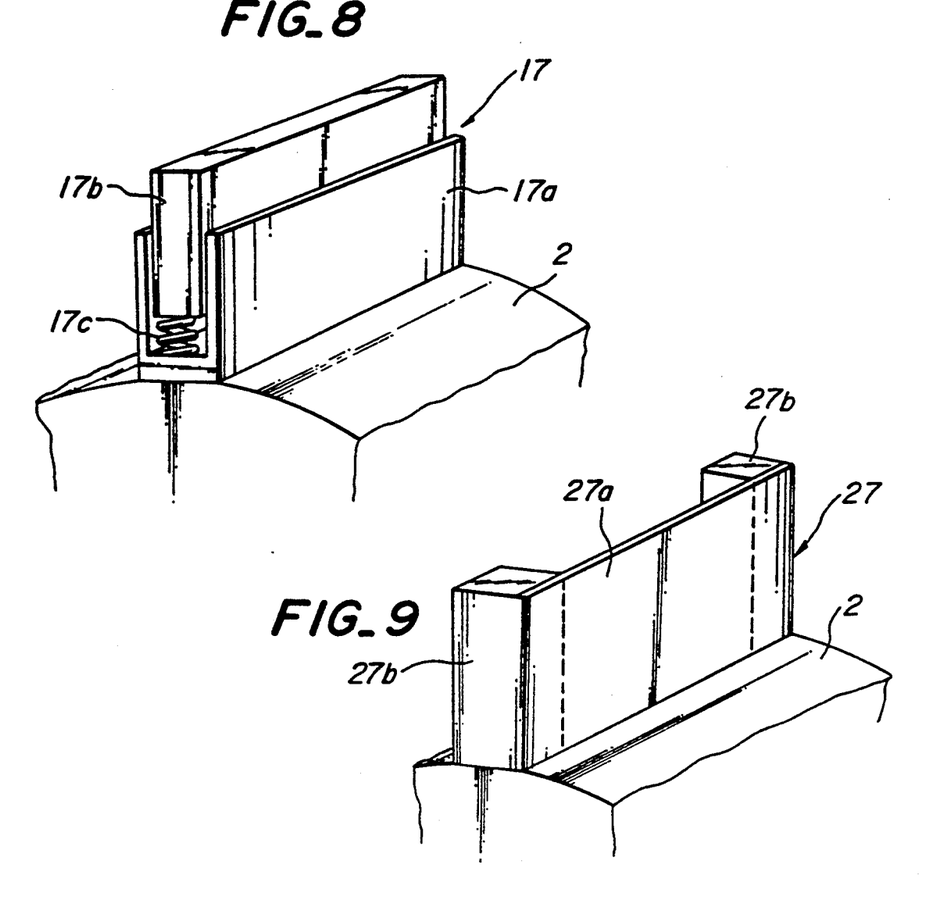
FIGS. 8, 9 and 10 are perspective views of axial sealing plates.

An axial sealing plate 17 shown in FIG. 8 may be used. That is, a metallic receptacle portion 17a having a U-letter shaped section is fixed to the outer periphery of the rotor 2, and a planar body 17b made of a wear resistive ceramic is placed in a recess of the receptacle portion 17a through a spring 17c. The planar body 17b is slidably pressed to the inner surface of the housing by means of the spring 17c, so that gas sealing is effected between the axial sealing plate and the housing. Since the self weight of the axial sealing plate is small, the axial sealing plate can easily and effectively be slidably pressed to the housing by attaching the spring to the receptacle portion as in the present embodiment. The wear resistive ceramic planar body 17b has the coefficient of thermal expansion of not more than $70 \times 10^{-7}/°$C., a great thickness, and a large dimension. This planar body 17b has excellent durability.

Figure 10:
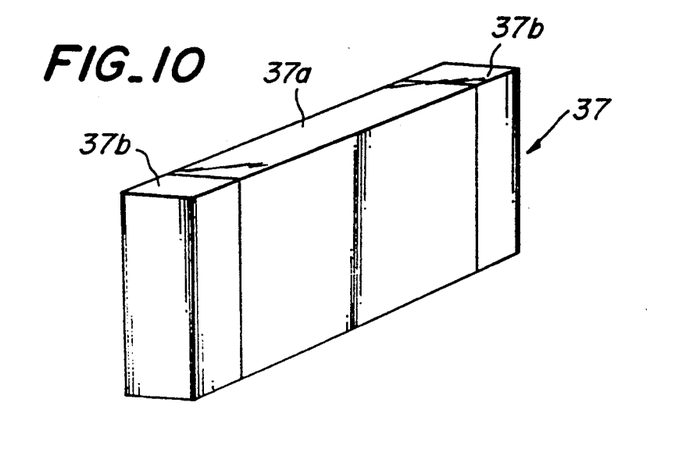

Further, it is effective to use composite plates 27 and 37 as shown in FIGS. 9 and 10 as the axial sealing plate.

In the embodiment of FIG. 9, a square columnar wear resistive ceramic 27b is fixed to each of opposed sides of a metallic thin plate 27a. In the embodiment of FIG. 10, a square columnar wear resistive ceramic 37b is fixed to each of opposed end faces of a metallic wall-like body 37a. In each of the embodiments, since the wear resistive ceramic 27b, 37b contacts and slides on the inner surface of the housing, wearing of the metallic portion 27b, 37b sandwiched between the wear resistive ceramic portions can be prevented because the wear resistive ceramic portions are difficult to wear, different from the metallic wall having a metallic slide surface. In addition, since a metallic member having a greater dimension is easier to produce from the standpoint of the production as compared with ceramics, the axial sealing plates 27, 37 are easier to be produced, particularly when the dimension of the rotor 2 is great.

Moreover, the wearing of the metal of the housing can effectively be prevented by providing a wear resistive ceramic or glass lining layer on the inner surface of the housing as is the same with the radial sealing plate so as to guide the opposed axial sealing plate therealong.

The structure of each of the above-mentioned axial sealing plates shown in FIGS. 8 through 10 may be used as that of the diaphragm plate in the radial seal.

Next, the bypass seal C (See FIG. 1) will be explained.

Figure 11:
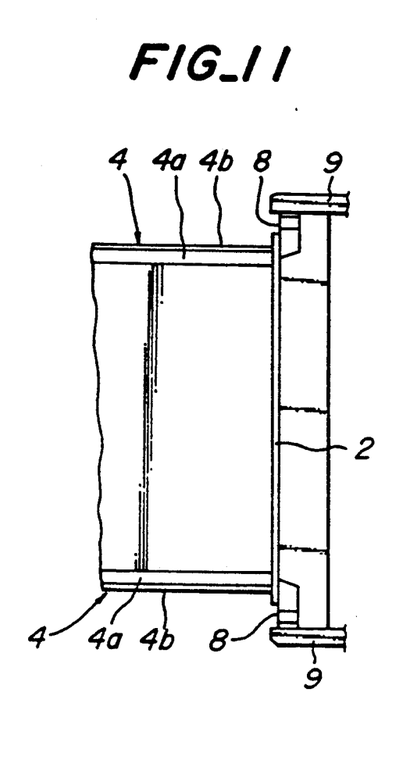
FIG. 11 is an outline view of a vicinity portion of an outer periphery of a rotor of the air preheater.
Figure 12:
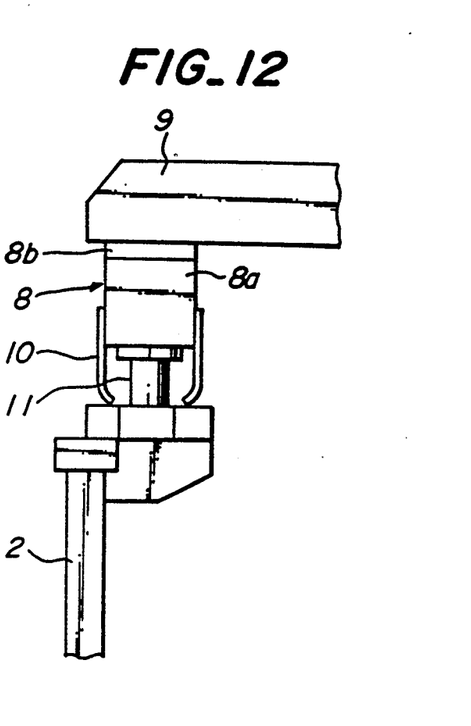
FIG. 12 is an enlarged view of a principal portion of FIG. 11.

FIG. 11 is an outline view showing a portion near the outer periphery of the rotor of the air preheater, and FIG. 12 is an enlarged view of a principal portion of FIG. 11.

In this embodiment, the present invention is applied to the sealing between an edge portion of the outer periphery of the rotor 2 and the rotor housing.

That is, a sealing bar 9 is fixed to the housing (at each of the upper edge portion and the lower edge portion in FIG. 11), and a sealing member 8 is held by a holder 10.

Figure 13:
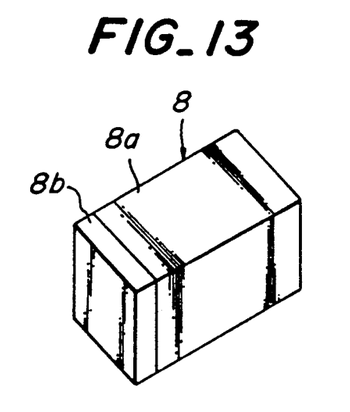
FIGS. 13 and 14 are perspective views of massive sealing members for bypass sealing.

As shown in FIG. 13, the sealing member 8 consists of a base body 8a and a thin layer portion 8b. The base body 8a is made of a corrosion resistive steel or a ceramic having the coefficient of thermal expansion of not more than $70 \times 10^{-7}/°$C. The entire construction of the base body 4a of the diaphragm plate shown in FIG. 4 is applicable to the base body 8a. The thin layer portion 8b is a thin layer made of a wear resistive ceramic or inorganic glass or a thin layer formed by glass lining. The entire structure of the thin plate 4b of the diaphragm plate shown in FIG. 4 can be applied to the thin layer portion 8b.

While the seal member 8 is being held by the holder 10, the base body 8 is contacted with a spring 11, and the thin layer portion 8b is contacted with the sealing bar 9. The thin layer is slidably pushed to the sealing bar 9 by the elasticity of the spring 11.

Figure 14:
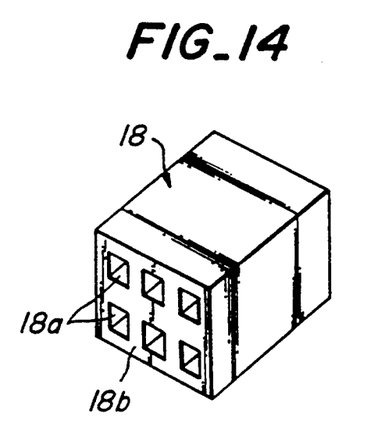
Figure 15:
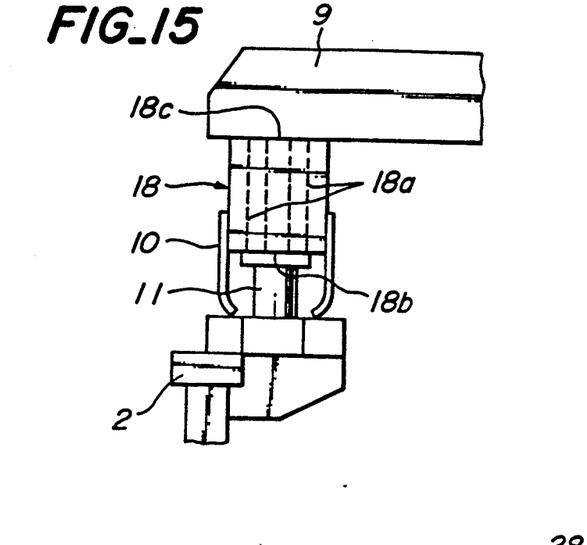
FIG. 15 is a front view illustrating that the sealing member in FIG. 14 is attached.

FIG. 14 is a perspective view of another sealing member 18. FIG. 15 shows the state in which the sealing member 18 is fitted to the holder as in the same manner with FIG. 12.

The entire shape of the sealing member 18 is the same as that of the sealing member 8, but a plurality of through holes are provided to connect opposed side faces 18b and 18c. One side face 18c is butted to the sealing bar 9, and the other side face 18b is contacted with the spring 11. Thereby, air leakage through the through holes 18a is prevented. The entire sealing member 18 is made of a wear resistive ceramic having the coefficient of the thermal expansion of not more than $70 \times 10^{-7}/°$C.

According to the sealing member 18 in this embodiment, the volume and weight of expensive wear resistive ceramic used can be reduced by the through hole 18a, and the cost can be lowered, in addition to the above-mentioned effects.

Further, when any of seal members shown in FIGS. 16 through 20 is used instead of the sealing member 8 or 18, the amount of the wear resistant ceramic can be reduced.

Figure 16:
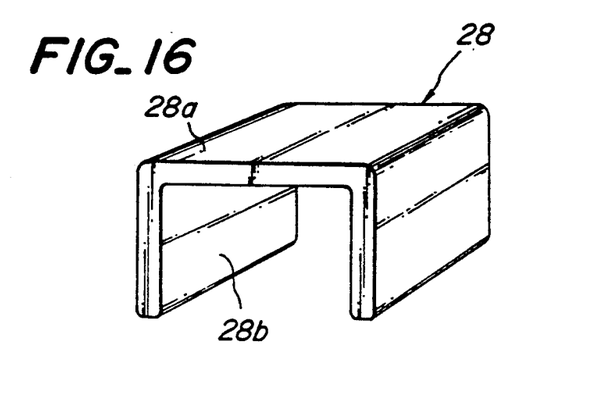
FIGS. 16, 17, 18, 19 and 21 are perspective views of other sealing members for bypass sealing.

The sealing member 28 shown in FIG. 16 is formed by a wear resistive ceramic having the coefficient of thermal expansion of not more than $70 \times 10^{-7}/°$C., and has a U-letter shaped section. The rear face 28a is contacted with the sealing bar, and slid thereto under pressure, while the recessed side 28b is pushed with the spring.

Figure 17:
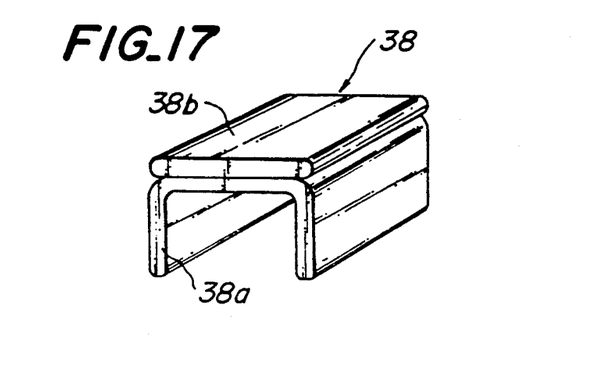

In the sealing member 38 shown in FIG. 17, a flat plate 38b made of wear resistive ceramic is fixed to the rear surface of a corrosion resistive steel block 38a having a U-letter shaped section. The plate 38b is slidably pressed to the sealing bar.

Figure 18:
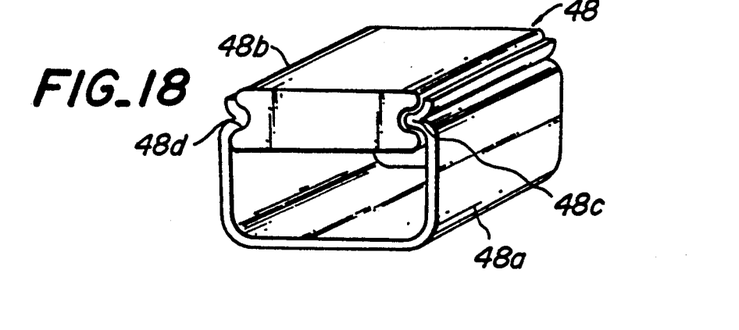

In the sealing member 48 shown in FIG. 18, a projections 48c are provided at edge portions of corrosion resistive steel base body 48a having an almost U-letter shaped section, and recesses 48d are formed in opposite side faces of a wear resistive ceramic plate 48b. The plate 48b is held by the base body by fitting the projections 48c to the recesses 48d. This plate 48b is slidably pressed to the sealing bar, and the base body 48a is pressed by the spring.

Figure 19:
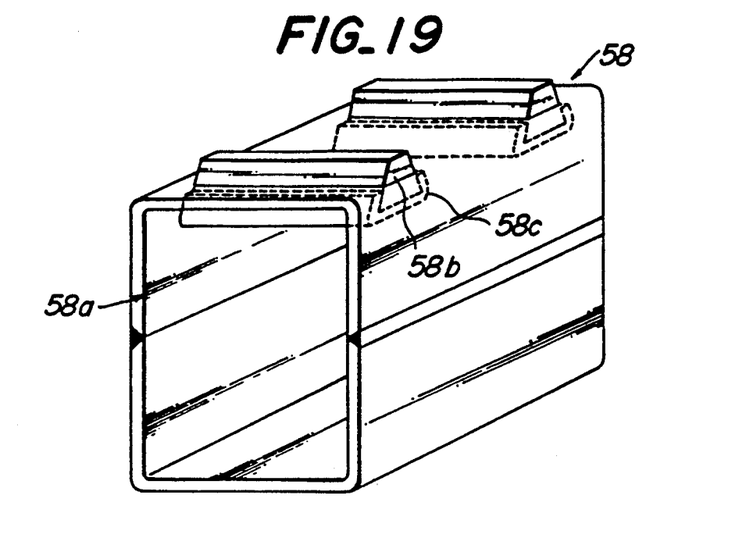
Figure 20:
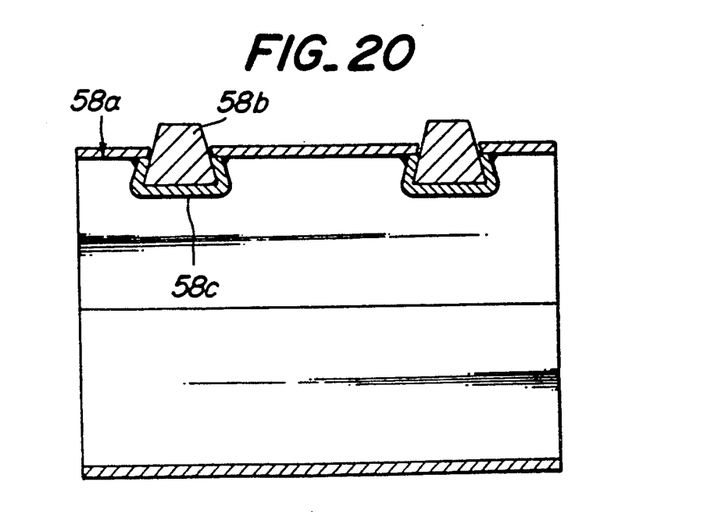
FIG. 20 is a sectional view of a principal portion of FIG. 19.

In a sealing member 58 shown in FIGS. 19 and 20, a plurality of holes having a rectangular section are formed in an upper face of a corrosion resistive steel base body 58a having a corner-rounded rectangular shaped section in few (for example, two or three) locations in a longitudinal direction. A wear resistive ceramic 58b is fitted to each of these holes while it is slightly projected from the upper face of the base body 58a. The upper face of the ceramic projecting from the upper face of the base body 58a is used as a sliding surface. The wear resistive ceramic 58b has a trapezoidal section shape, and is entirely surrounded with the corrosion resistive steel (58a and 58c) at a location positioned under the hole. The steel 58c has a top-opened trapezoidal section, and is welded to opposite edges of the hole as shown in FIG. 20.

This sealing member 58 is slidably pressed to the sealing bar by means of a spring. Since the wear resistive ceramic 58b is entirely surrounded with the corrosion resistive steel excluding the sliding side, it is more thermally stable against thermal shocks due to washing with water. In this case, wear resistive ceramics having a coefficient of thermal expansion of more than $70 \times 10^{-7}/°$C., such as alumina may be used for the ceramic 58b.

Figure 21:
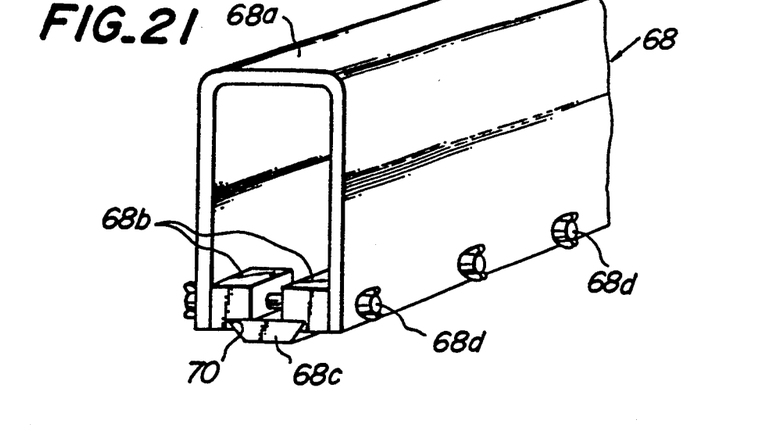
Figure 22:
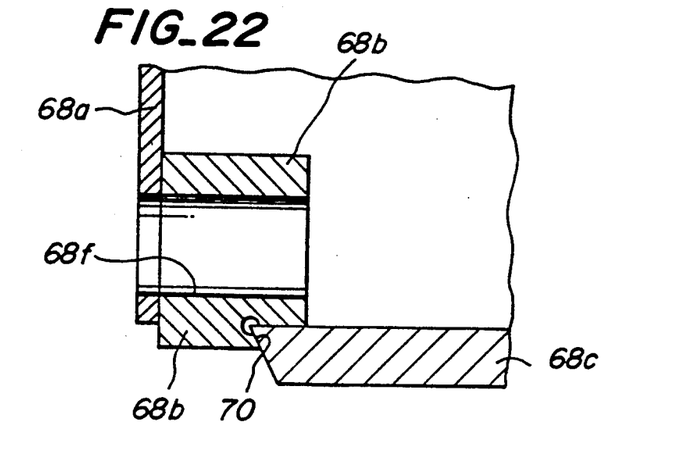
FIG. 22 is an enlarged view of a principal portion of FIG. 21.

FIG. 21 is a broken perspective view of a sealing member 68. FIG. 22 is an enlarged view of a principal portion of FIG. 21.

In this embodiment, fixing pieces (for example, made of SUS steel) 68b are fitted to a ceramic or corrosion resistive steel base body 68a having a U-letter shaped section at plural locations (for examples, three or four locations) in a longitudinal direction. More specifically, a piece-fixing bolt 68d is passed through a through hole 68f to fix the fixing pieces 68b at a specific location, opposite ends of a trapezoidal plate 68c made of a wear resistive ceramic are fitted to notches 70 of the fixing pieces 68b, and the piece-fixing bolts 68d are tightened to fix the pieces 68b and the plate 68c in the position shown.

In this embodiment, instead of the fixing pieces 68b provided at plural locations in the longitudinal direction, two fixing pieces having the same length as that of the base body 68a are fixed so that the base body 68a is covered with these two opposed fixing pieces over its entire length. In this case, there are merits that the sealing performance can more excellently be improved. In this embodiment, the wear resistive ceramic plate 68c slidably pressed to the sealing bar can be exchanged at arbitrary time, or the base body 68a may be exchanged at arbitrary time.

When a thin plate made of wear resistive ceramic is incorporated into the surface of the sealing bar or fixed thereto, the sealing bar is a ceramic guide to which the sealing member is slidably pressed, the wear resistance of the sealing bar can effectively be increased. As a matter of course, it may be that the acid resistive enamel or glass lining may be applied to the surface of the sealing bar.

Now, concrete examples of the present invention will be explained.

EXAMPLE 1

Thermal shock resistance of each of samples was examined under the following conditions.
Sample:
100×100×t mm (thickness).
The thickness t was varied at t=1, 2, 3, 5, 10 and 100.
Temperature difference:
Kept in a thermostat vessel (170° C.) for one hour, and placed in water (20° C.).
The temperature difference was 150° C.
Evaluation:
Occurrence of cracks was checked by a coloring test.
In Table 1, X and ◯ denote occurrence of cracks and absence of cracks, respectively.
Ceramics:
Silicon nitride, silicon carbide, alumina, mullite, sialon, and zirconia Coefficients of thermal expansion of porcelains:
Porcelain A 86×10$^{-7}$/° C.
Porcelain B 74×10$^{-7}$/° C.
Porcelain C 70×10$^{-7}$/° C.
Porcelain D 63×10$^{-7}$/° C.
Porcelain E 58×10$^{-7}$/° C.

TABLE 1

Results in thermal shock resistance tests of ceramics

| Ceramics Material | Coefficient of thermal expansion × 10$^{-7}$/°C. | Results (temperature difference: 150° C.) | | | | | |
|---|---|---|---|---|---|---|---|
| | | 1 mm | 2 mm | 3 mm | 5 mm | 10 mm | 100 mm |
| Silicon nitride | 22 | ◯ | ◯ | ◯ | ◯ | ◯ | ◯ |
| Silicon carbide | 45 | ◯ | ◯ | ◯ | ◯ | ◯ | ◯ |
| Alumina | 80 | ◯ | ◯ | ◯ | X | — | — |
| Mullite | 49 | — | — | ◯ | ◯ | ◯ | ◯ |
| Sialon | 30 | ◯ | ◯ | ◯ | ◯ | ◯ | ◯ |
| Zirconia | 105 | ◯ | ◯ | ◯ | X | — | — |
| Porcelain A | 86 | ◯ | ◯ | ◯ | X | — | — |
| Porcelain B | 74 | ◯ | ◯ | ◯ | ◯ | ◯ | X |
| Porcelain C | 70 | ◯ | ◯ | ◯ | ◯ | ◯ | ◯ |
| Porcelain D | 63 | — | — | — | — | ◯ | ◯ |
| Porcelain E | 58 | — | — | — | — | ◯ | ◯ |

A ceramic thin plate ① having a composition and a ceramic plate ② as given in the following Table 2 were joined together, and a thus obtained sample was subjected to a thermal shock resistance test.

TABLE 2

Results in thermal shock resistance of joined samples

| Ceramic ① | | Ceramic ② | | Results |
|---|---|---|---|---|
| Material | Thickness (mm) | Material | Thickness (mm) | (temperature difference: 150° C.) |
| Silicon nitride | 3 | Porcelain E | 97 | ◯ |
| Silicon nitride | 1 | Porcelain E | 99 | ◯ |
| Silicon carbide | 2 | Porcelain E | 98 | ◯ |
| Sialon | 1 | Porcelain E | 99 | ◯ |
| Zirconia | 1 | Porcelain C | 99 | ◯ |
| Alumina | 4 | Porcelain E | 96 | X |
| Alumina | 1 | Porcelain C | 99 | ◯ |
| Alumina | 1 | Porcelain D | 99 | ◯ |
| Alumina | 3 | Porcelain C | 97 | ◯ |

EXAMPLE 2

As mentioned below, a corrosion resistive steel was coated with enamel, which was subjected to a thermal shock resistance test, a wear resistance test, and a corrosion resistance test.
Sample:
Base body:
Corrosion resistive steel
Treatment:
Coated with enamel in a thickness of 0.3 mm, 0.7 mm or 1.2 mm (Comparison: No enamel was coated)
Thermal shock resistance test:
Base body:
100×100×3 mm metallic panel Sample was held in a thermostat vessel (170° C.) for one hour, and placed into water (20° C). The difference in temperature was 150° C.
Evaluation:

Occurrence of cracks was checked by the coloring test. ◯ and X denote absence of cracks and occurrence of cracks, respectively.

Wear resistance test:
Base body:
Round plate of 100 mm in diameter and 3 mm in thickness.
Load:
4 kg (50 g/cm$^2$)
Tester:
600 mm diameter round disc, rotated at 30 r.p.m.
Evaluation:
Worn thickness (mm × 10$^{-5}$/hr)

Corrosion resistance test:
Base body:
Round plate of 100 mm in diameter × 3 mm thickness
Corrosive liquid:
3% H$_2$SO$_4$ or 3% HNO$_3$
Temperature:
70° C.
Evaluation:
Corroded state was observed.
"◯" and "X" denote "not changed" and "corroded layer formed", respectively.

TABLE 3

| Enamel-treating method | Thermal shock test | Wear resistance test mm × 10$^{-5}$/hr | Corrosion resistance test | |
|---|---|---|---|---|
| | | | 3% H$_2$SO$_4$ | 3% HNO$_3$ |
| Present invention | | | | |
| Coated with enamel in thickness of 0.3 mm | ◯ | 0.12 | ◯ | ◯ |
| Coated with enamel in thickness of 0.7 mm | ◯ | 0.14 | ◯ | ◯ |
| Coated with enamel in thickness of 1.2 mm | ◯ | 0.09 | ◯ | ◯ |
| Comparative example | | | | |
| Not coated with enamel | ◯ | 0.42 | X | X |

EXAMPLE 3

A base body made of a corrosion resistive steel was used, and a ceramic thin plate made of a material with a thickness given in Table 4 was joined to the base body as a sliding surface. Then, each of test samples was subjected to the wear resistance test, the wear resistance test for the sliding surface, and the corrosion resistance test in the same manners given in Example 2. "◯" in the thermal shock test denotes "not cracked", and "◯" in the corrosion resistance test denotes "not changed".

TABLE 4

| Ceramic thin plate constituting sliding surface | | Thermal shock test | Wear resistance test mm × 10$^{-5}$/hr | Corrosion resistance test | |
|---|---|---|---|---|---|
| Thickness (mm) | Material | | | 3% H$_2$SO$_4$ | 3% HNO$_3$ |
| 1 | Silicon nitride | ◯ | 0.06 | ◯ | ◯ |
| 1 | Silicon carbide | ◯ | 0.12 | ◯ | ◯ |
| 0.6 | Alumina | ◯ | 0.08 | ◯ | ◯ |
| 1.2 | Sialon | ◯ | 0.07 | ◯ | ◯ |
| 0.9 | Zirconia | ◯ | 0.11 | ◯ | ◯ |
| 10.0 | Carbon | ◯ | 5.00 | ◯ | ◯ |

EXAMPLE 4

It was confirmed through measurement of the thermal shock resistance of alumina that the thermal shock resistance was improved by surrounding the alumina with a corrosion resistive steel.

Sample:
Alumina having a shape (having a trapezoidal section of an upper side of 100 mm, a bottom side of 70 mm and a height of 20 mm with a length of 100 mm).

The alumina was surrounded with no corrosion resistive steel (not surrounded), or the alumina was surrounded with a 3 mm thick corrosion resistive steel (surrounded) while excluding the bottom face having the side length of 70 mm.

The sample was kept in a thermostat vessel at 170° C. for one hour, and placed into water at 20° C. The temperature difference was thus 150° C.

Occurrence of cracks was checked by the coloring test. In Table 5, X and ◯ denote "cracked" and ""not cracked", respectively.

TABLE 5

Results in thermal shock resistance test for alumina

| Presence or absence of surrounding with corrosion resistive steel | Result in thermal shock resistance test |
|---|---|
| not surrounded | X |
| surrounded | ◯ |

EXAMPLE 5

The above-given sealing members were applied to an air preheater, and their effects were checked.

Locations at which the sealing members were applied are as follows:

① Outer peripheral portion of the rotor (axial sealing plate 7), that is, a contact portion between an outer periphery of the rotor and the housing (axial seal A) (FIG. 1).

② Inner surface of the housing, that is, a contact portion between an outer periphery of the rotor and the housing (axial seal A) (FIG. 1).

③ Side face of the rotor (sealing member 8), that is a contact portion between the side face of the rotor and the bypass portion (bypass seal C) of the housing (FIG. 11).

④ Sealing bar 9 of the housing, that is, a contact portion between the side face of the rotor and the bypass portion (bypass seal C) of the housing (FIG. 11).

⑤ Radial sealing plate 6, that is, a contact portion between the diaphragm plate 4 of the side face of the rotor and the radial sealing plate 6 (radial seal B) (FIGS. 1, 3 and 4).

⑥ Diaphragm plate 4, that is, a contact portion between the diaphragm plate 4 of the side face of the rotor and radial sealing plate 6 (radial seal B) (FIGS. 1, 3 and 4).

TABLE 6(a)

| Sealing structure No. | Sealed location and sealing member | | Sealing method | Evaluation |
|---|---|---|---|---|
| Present Invention | | | | |
| 1 | ①, ②: | metallic member (corrosion resistive steel) | Structural seal | ○ |
| | ③: | 1 mm thick silicon nitride joined to porcelain | press fitted and slid at 20 g/cm² | |
| | ④: | metallic member (corrosion resistive steel) | | |
| | ⑤: | corrosion resistive steel coated with 0.7 mm thick enamel | press fitted and slid at 10 g/cm² | |
| | ⑥: | metallic member (corrosion resistive steel) | | |
| 2 | ①: | corrosion resistive steel coated with 0.7 mm thick enamel | press fitted and slid at 10 g/cm² | ○ |
| | ②: | metallic member (corrosion resistive steel) | | |
| | ③: | 0.6 mm thick alumina joined to porcelain | press fitted and slid at 20 g/cm² | |
| | ④: | metallic member (corrosive resistive steel) | | |
| | ⑤: | corrosion resistive steel coated with 0.7 mm thick enamel | press fitted and slid at 10 g/cm² | |
| | ⑥: | metallic member (corrosion resistive | | |

TABLE 6(b)

| Sealing structure No. | Sealed location and sealing member | | Sealing method | Evaluation |
|---|---|---|---|---|
| Present invention | | | | |
| 3 | ①: | corrosion resistive steel coated with 0.3 mm thick enamel | press fitted and slid at 10 g/cm² | ○ |
| | ②: | 2 mm thick silicon nitride plate joined | | |
| | ③: | 2 mm thick silicon carbide plate joined to porcelain | press fitted and slid at 10 g/cm² | |
| | ④: | 2 mm thick silicon carbide plate joined to porcelain | | |
| | ⑤: | corrosion resistive steel coated with 1.2 mm thick enamel | press fitted and slid at 10 g/cm² | |
| | ⑥: | metallic member (corrosion resistive steel) | | |
| 4 | ①: | silicon nitride block (17B in FIG. 8) | press fitted and slid at 10 g/cm² | |
| | ②: | corrosion resistive steel coated with 0.7 mm thick enamel | | |
| | ③: | silicon nitride flat plate fitted to corrosion resistive steel base body | press fitted and slid at 20 g/cm² | |
| | ④: | 2 mm thick silicon nitride joined to porcelain | | |
| | ⑤: | corrosion resistive steel coated with 0.7 mm thick enamel | press fitted and slid at 10 g/cm² | |
| | ⑥: | corrosion resistive steel coated with 0.7 mm thick enamel | | |

TABLE 6(c)

| Sealing structure No. | Sealed location and sealing member | | Sealing method | Evaluation |
|---|---|---|---|---|
| Present invention | | | | |
| 5 | ①: | metallic member (corrosion resistive steel) | Structural seal | ○ |
| | ②: | metallic member (corrosion resistive steel) | | |
| | ③: | 20 mm thick alumina entirely covered with corrosion resistive steel excluding sliding surface (FIG. 20) | press fitted and slid at 10 g/cm² | |
| | ④: | metallic member (corrosion resistive steel) | | |
| | ⑤: | metallic member (corrosion resistive steel) | Structural seal | |
| | ⑥: | metallic member (corrosion resistive steel) | | |
| 6 | ①: | silicon nitride block (17B in FIG. 8) | press fitted and slid at 10 g/cm² | ○ |
| | ②: | corrosion resistive steel coated with 0.7 mm thick enamel | | |
| | ③: | 20 mm thick alumina entirely covered with corrosion resistive steel excluding sliding surface (FIG. 20) | press fitted and slid at 20 g/cm² | |
| | ④: | 2 mm thick silicon nitride joined to porcelain | | |
| | ⑤: | corrosion resistive steel coated with 0.7 mm thick enamel | press fitted and slid at 10 g/cm² | |
| | ⑥: | corrosion resistive steel coated with 0.7 mm | | |

TABLE 6(c)-continued

| Sealing structure No. | Sealed location and sealing member | Sealing method | Evaluation |
|---|---|---|---|
| | thick enamel | | |

TABLE 6(d)

| Sealing structure No. | Sealed location and sealing member | Sealing method | Evaluation |
|---|---|---|---|
| Prior Art | | | |
| 7 | ①: metallic member (corrosion resistive steel) | Structural seal | X |
|   | ②: metallic member (corrosion resistive steel) | | |
|   | ③: metallic member (corrosion resistive steel) | press fitted and slid at | |
|   | ④: metallic member (corrosion resistive steel) | 5 g/cm² | |
|   | ⑤: metallic member (corrosion resistive steel) | Structural seal | |
|   | ⑥: metallic member (corrosion resistive steel) | | |
| 8 | ①: metallic member (corrosion resistive steel) | Structural seal | X |
|   | ②: metallic member (corrosion resistive steel) | | |
|   | ③: metallic member (corrosion resistive steel) | Structural seal | |
|   | ④: metallic member (corrosion resistive steel) | | |
|   | ⑤: metallic member (corrosion resistive steel) | Structural seal | |
|   | ⑥: metallic member (corrosion resistive steel) | | |

Evaluation
○: Sealing effect was excellent, and operation could be continued for more than 24 months without repair.
X: Sealing effect dropped within 24 months, and a sealing member was exchanged. Or, operation was continued in the state the sealing effect dropped.

In the air preheater with the sealing member (Sealing structure Nos. 1~6) according to the present invention, since the sealing member contacts the sealed portion in a closely fitted state, excellent sealing effect can be obtained. The sealing member closely fits to the sealed portion to maintain gas sealingness in the sliding state. Since the ceramic or enamel having excellent wear resistance is joined to the surface of one of the constituent parts of the sealing member, merits can be obtained that the sealing member can be used for a prolonged time period, and the frequency of maintenance can be reduced.

Further, since the sealing member is pressed to the inner surface of the sealed portion, a gap between the sealing member and the sealed portion can spontaneously be lessened even when the rotor or the housing is thermally deformed. Thereby, the closely fitted state can always be maintained.

To the contrary, in conventional Sealing structure No. 7, the metallic sealing member slidably press fitted at the sealed portion was deteriorated in a relatively short time, constituent parts needed to be replaced in a periodic inspection after one year. Further, since conventional Sealing structure No. 8 was a conventional sealing structure which did not slide under pressure, sealing effect lowered at locations where the rotor or the housing was deformed with heat.

According to the sealing member of the present invention for use in the gas preheater, since at least a part of the sealing member is formed with the inorganic glass and/or the wear resistive ceramic, corrosion with hot exhaust gases can effectively be prevented, and wear resistance is improved, and excellent sealing performance can be maintained for a long time period. Further, since the sealing surface is formed with the inorganic glass and/or the wear resistive ceramic having a smaller coefficient of thermal expansion or since the ceramic sliding member is covered with the corrosion resistive steel excluding the sliding surface portion, it is possible that thermal shock resistance is improved, use life is prolonged, and the frequency of maintenance is reduced. Furthermore, it is possible to slide the sealing member for the air preheater under pressure, and it is also possible to seal the sealing member in the closely fitted state always.

By so doing, the heat efficiency of the gas preheater can be improved for a long time period.

What is claimed is:

1. A sealing member for sealing a gap between an outer surface of a rotor and a housing in a gas preheater adapted to recover heat from exhaust gases emitted from a boiler using heavy coal or heavy oil as a fuel, said sealing member comprising:

an elongate rectangular tubular metal base body having an upper surface to be arranged opposed to one of the outer surface of the rotor and a sealing bar of the housing, a plurality of holes provided in said upper surface, and a plurality of metal members each fixed to an inner surface of said metal base body to define, in cooperation with said holes, a plurality of trough-shaped recesses in said upper surface; and a plurality of sliding members, each fixed in one of said trough-shaped recesses such that only an upper sliding face portion of each of said sliding members, which upper sliding face portion is to contact one of the outer surface of the rotor and a sealing bar of the housing, extends upwardly from and is exposed outside of said metal base body, said surface members comprising at least one water insoluble and acid-resistant member selected from the group consisting of a) a ceramic selected from the group consisting of alumina-containing porcelain, alumina, silicon carbide, silicon nitride, mullite, sialon and zirconia, said ceramic having a coefficient of thermal expansion of not more than $70 \times 10^{-7}/°$ C.; and b) an inorganic glass selected from the group consisting of glass lining consisting essentially of at least 55 wt % silicic acid, 0–10 wt % boric acid and 10–20 wt % alkali, and an acid-resistant enamel consisting essentially of at least 40 wt % silicic acid, 0–10 wt % boric acid and 10–30 wt % alkali.

2. The sealing member of claim 1, wherein each of said sliding members has a trapezoidal cross-sectional shape and an inner surface of each of said metal members has a cross-sectional shape complementary to that of each of said sliding members.

3. The sealing member of claim 1, wherein each of said sliding members consists of said ceramic, and said metal base body comprises corrosion-resistant steel.

* * * * *